(12) United States Patent
Teglia (10) Patent No.: US 8,767,955 B2
(45) Date of Patent: Jul. 1, 2014

(54) PROTECTION OF A MODULAR EXPONENTIATION CALCULATION BY MULTIPLICATION BY A RANDOM QUANTITY

(75) Inventor: Yannick Teglia, Belcodene (FR)

(73) Assignee: STMicroelectronics (Rousset) SAS, Rousset (FR)

( * ) Notice: Subject to any disclaimer, the term of this patent is extended or adjusted under 35 U.S.C. 154(b) by 0 days.

(21) Appl. No.: 13/543,106

(22) Filed: Jul. 6, 2012

(65) Prior Publication Data

US 2013/0016828 A1    Jan. 17, 2013

(30) Foreign Application Priority Data

Jul. 13, 2011    (FR) ...................... 11 56370

(51) Int. Cl.
*H04L 9/28*    (2006.01)

(52) U.S. Cl.
USPC .................. 380/28; 708/1; 708/100

(58) Field of Classification Search
None
See application file for complete search history.

(56) References Cited

U.S. PATENT DOCUMENTS

| | | | |
|---|---|---|---|
| 6,408,075 B1 | 6/2002 | Ohki et al. | |
| 7,248,700 B2 * | 7/2007 | Seifert et al. | 380/282 |
| 8,135,129 B2 * | 3/2012 | Teglia et al. | 380/28 |
| 2004/0125950 A1 * | 7/2004 | Yen et al. | 380/30 |
| 2006/0222175 A1 * | 10/2006 | Itoh et al. | 380/28 |
| 2007/0177721 A1 | 8/2007 | Itoh et al. | |
| 2009/0092245 A1 * | 4/2009 | Fumaroli et al. | 380/28 |
| 2010/0208883 A1 * | 8/2010 | Teglia et al. | 380/28 |

FOREIGN PATENT DOCUMENTS

WO    WO 2007000701 A2    1/2007

OTHER PUBLICATIONS

French Search Report and Written Opinion dated Nov. 22, 2011 from corresponding French Application No. 11/56370.
French Search Report and Written Opinion dated Nov. 22, 2011 from related French Application No. 11/56371.
French Search Report and Written Opinion dated Nov. 22, 2011 from related French Application No. 11/56373.
Menezes A., et al. *Handbook of Applied Cryptography*, 1997, CRC Press, Boca Raton, FL, EU, XP002188328, ISBN: 978-0-8493-8523-0 pp. 613-629.
Changkyun, K, et al.: *A Secure and Practical CRT-Based RSA to Resist Side Channel Attacks*, ICCSA 2004; LNCS, vol. 3043, Apr. 2,3, 2004, pp. 150-158, XP019006751, Springer-Verlag, Berlin, DE.

* cited by examiner

*Primary Examiner* — Philip Chea
*Assistant Examiner* — Khoi Le
(74) *Attorney, Agent, or Firm* — Wolf, Greenfield & Sacks, P.C.

(57) ABSTRACT

A method for protecting a calculation, by an electronic circuit, of a modular exponentiation of a digital quantity, wherein: a first variable is initialized with a random quantity; at least one second variable is initialized with a value which is a function of the digital quantity; at least for a bit at 1 of an exponent of the modular exponentiation, the first variable is updated by: a) the quotient of its content and a power of the random quantity; and b) the product of its content by that of the second variable; and once all the exponent bits have been processed, the content of the first variable is divided by the random quantity to provide the result of the modular exponentiation.

22 Claims, 10 Drawing Sheets

PROTECTION OF A MODULAR EXPONENTIATION CALCULATION BY MULTIPLICATION BY A RANDOM QUANTITY

CROSS REFERENCE TO RELATED APPLICATIONS

This application claims the priority benefit of French patent application number 11/56370, filed on Jul. 13, 2011, entitled PROTECTION OF A MODULAR EXPONENTIATION CALCULATION BY MULTIPLICATION BY A RANDOM QUANTITY, which is hereby incorporated by reference to the maximum extent allowable by law.

BACKGROUND

1. Technical Field

Embodiments generally relate to electronic circuits and, more specifically, to circuits executing, in hardware or software fashion, signature or encryption algorithms implementing modular exponentiations or products on elliptic curves. Modular exponentiations are implemented, for example, by RSA-type algorithms, and operations on elliptic curves can be found, for example, in public key cryptography. Embodiments more specifically apply to the protection of data manipulated by such calculations against side channel attacks.

2. Discussion of the Related Art

To protect data (typically, secret quantities) manipulated by calculations of modular exponentiation or on elliptic curves against side channel attacks, for example, DPA-type (Differential Power Analysis) attacks, random numbers are generally used to mask the quantities manipulated by the algorithm.

The calculation is efficiently protected by masking of the message (the data) or the point on the curve to be submitted to the calculation to protect its operation with the secret quantity.

However, at the end of the calculation, the result has to be unmasked, that is, the contribution of the random quantity to this result (encrypted message, signature, etc.) has to be suppressed, failing which the result cannot be exploited.

In usual circuits, the unmasking is highly resource-consuming (in terms of power, calculation time, etc.).

SUMMARY

An embodiment overcomes all or part of the disadvantages of usual solutions for protecting calculations of modular exponentiation or on elliptic curves.

An embodiment decreases the amount of resources necessary for the calculation, including the unmasking.

An embodiment according to a first aspect is to provide a solution more specifically intended for modular exponentiation calculations.

According to this first aspect, an embodiment provides a solution particularly well adapted to RSA-type algorithms.

An embodiment according to a second aspect provides a solution more specifically intended for calculations on elliptic curves.

According to this second aspect, an embodiment provides a solution particularly well adapted to asymmetrical cryptography using elliptic curves.

An embodiment provides a method for protecting a calculation, by an electronic circuit, of a modular exponentiation of a digital quantity, wherein:

a first variable is initialized with a random quantity;

at least a second variable is initialized with a value which is a function of said digital quantity;

at least for a bit at 1 of an exponent of the modular exponentiation, the first variable is updated with:

a) the quotient of its content and a power of said random quantity; and b) the product of its content by that of the second variable, once all the bits of the exponent have been processed, the content of said first variable is divided by said random quantity to provide the result of the modular exponentiation.

According to an embodiment, step a) is carried out for all the bits of the exponent and is carried out before step b), the exponent bits being processed successively from the least significant bit and the second variable containing said digital quantity.

According to an embodiment, the content of said first variable is squared before step a), step a) corresponding to a division of the first variable by the random quantity.

According to an embodiment, step a) is carried out after step b), the first variable being only updated for the exponent bits equal to 1, the exponent bits being successively processed from the most significant bit and the second variable being initialized with said digital quantity multiplied by the random quantity.

According to an embodiment, for each exponent bit:
the content of the second variable is squared; then
the content of the second variable is divided by the random quantity.

According to an embodiment, if the exponent bit is at 0, a third variable is updated at least with the content of the first variable multiplied by that of the second variable.

According to an embodiment:
the exponent bits are successively processed by groups of bits;
step a) is carried out for each group of bits and corresponds to dividing the first variable by a power, equal to the number of bits in the group, of the random quantity;
step a) is carried out before step b); and
step b) is carried out for all groups comprising at least one bit at 1.

According to an embodiment, step b) comprises updating the first variable with said digital quantity raised to a power corresponding to the decimal value represented by the bits in the group.

According to an embodiment, if all bits in the group are at 0, a third variable is updated at least with the content of the first variable multiplied by that of the second variable.

According to an embodiment, said random quantity is a power of two.

According to an embodiment, said exponent corresponds to a secret quantity.

Another embodiment provides a method of cryptography according to an RSA algorithm, wherein each modular exponentiation is calculated by implementing the above method.

Another embodiment provides an electronic circuit capable of implementing the above method.

The foregoing and other objects, features, and advantages will be discussed in detail in the following non-limiting description of specific embodiments in connection with the accompanying drawings.

DETAILED DESCRIPTION

The same elements have been designated with the same reference numerals in the different drawings. For clarity, only those elements which are useful to the understanding of the described embodiments have been shown and will be detailed. In particular, the origin and the destination of the manipulated digital quantities have not been detailed, the embodiments being compatible with uses of such digital quantities.

Figure 1:
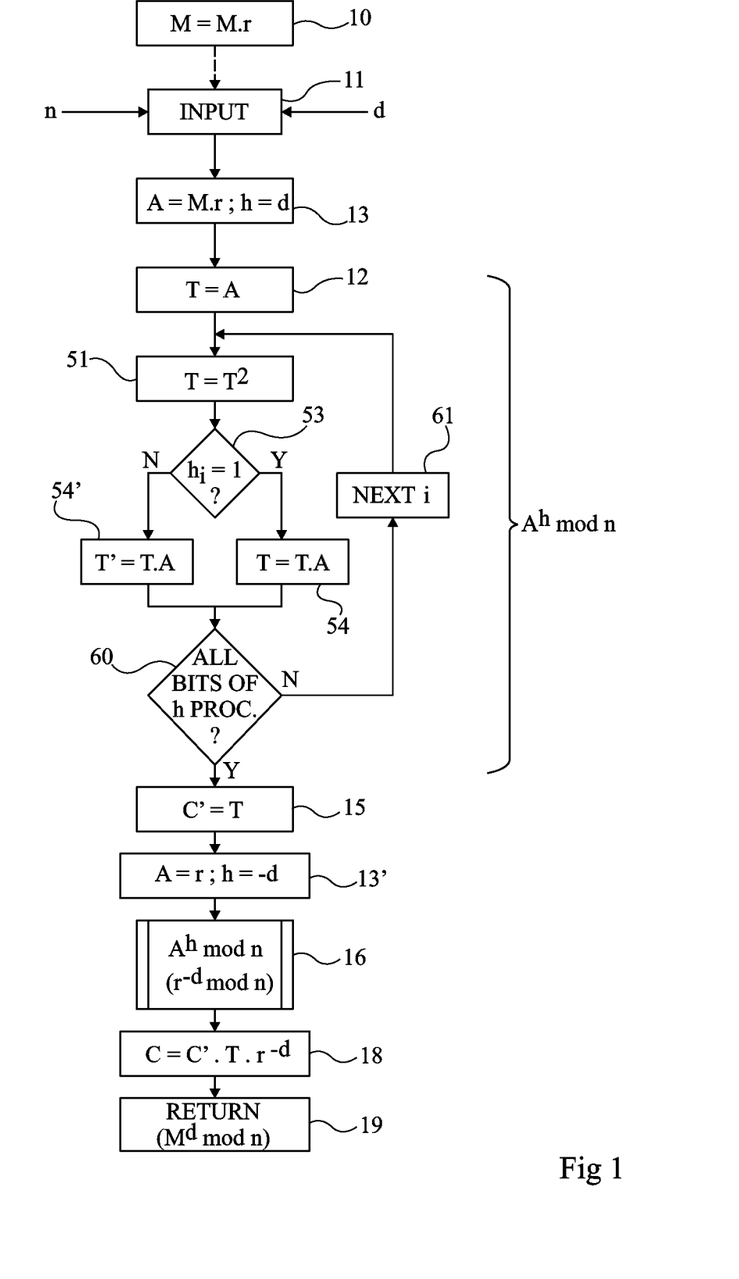
FIG. 1 is a simplified flowchart of a usual example of protected modular exponentiation calculation.

FIG. 1 is a flowchart illustrating a usual example of modular exponentiation calculation applied to an RSA-type algorithm.

A quantity $M^d$ mod n, where M stands for the message or the quantity to be encrypted or decrypted, d stands for the secret quantity, and n stands for the modulo of the operation, is desired to be calculated. In the RSA algorithm, this modulo corresponds to a product of prime numbers p and q corresponding to the factors of the encryption module (n=p.q). Encryption exponent d is, in the RSA algorithm, an integer selected to be prime with the Euler totient $\phi(n)$ of encryption module n. The encryption key is generally designated as e and the decryption key is generally designated as d. Pair (n, e) corresponds to the public key and pair (n, d) corresponds to the private key. Other designations may of course be used.

More generally, a modular exponentiation of a message or of data M, with an exponent d corresponding to a secret quantity and modulo a number n, may be used in various encryption or signature algorithms (for example, Gamal, DSA, Diffie-Hellman).

As illustrated in FIG. 1, to protect calculations, and especially the secret quantity of the exponent, the message to be encrypted with a random quantity r is generally masked. This masking comprises multiplying (block 10, M=M.r) message M by quantity r.

Usually, such a masking with a random number is performed before the input of the quantity to be processed into the modular exponentiation calculation cell. The masked message is input (block 11, INPUT) into the calculation cell, with quantity n standing for the modulo and quantity d standing for the exponent. The operands of the modular exponentiation are (block 13) A=M.r and h=d, the modular exponentiation comprising calculating value $A^h$ mod n. A variable T is initialized with value A (bloc 12, T=A). As a variation, variable T is directly initialized with value M.r at step 13.

Then, an iterative calculation loop on all bits $h_i$ of exponent h, identified by an index i, is started. The exponent bits are processed successively (with i ranging from 0 to m−1, where m stands for the number of bits of the exponent).

In each iteration, a first step comprises (block 51, $T=T^2$) a squaring of variable T. Then (bloc 53, $h_i$=1?), the state of current bit $h_i$ of the exponent is tested. If this bit is equal to 1 (output Y of block 53), the content of variable T is updated by being multiplied by value A (block 54, T=T.A). If it is not (output N of block 53), a useless variable T' receives product T.A (block 54', T=T.A). Performing a useless operation when the current exponent bit is at state 0 improves the masking of the calculation by preventing an attacker from detecting the state of the exponent bit by side channel attack. Indeed, the circuit power consumption or radiation then becomes identical since the same operations are carried out. As long as all the bits of exponent h have not been processed yet (output N of block 60, ALL BITS OF h PROC. ?), it is proceeded to the next bit (block 61, NEXT i) of the exponent and it is returned to the input of step 51. Once all the exponent bits have been processed, quantity $A^h$ mod n is contained in variable T. This quantity corresponds to value $(M.r)^d$ mod n. This result is then transferred into an intermediate result variable C' (block 15, C'=T).

Then, a second modular exponentiation aiming at eliminating the drift introduced by random quantity r, that is, at unmasking the result, is performed. To achieve this, random quantity r (which has thus been previously stored) is placed in variable A, and the opposite (−d) of quantity d is placed in exponent variable h (block 13', A=r; h=−d). Opposite −d corresponds to a value arithmetically linked to d, such as Md.M d=M0=1. This opposite value corresponds, for example, to a one-by-one inversion of the state of each bit of the exponent. According to another example, value −d has all its bits identical to value d, except for a sign bit. A second modular exponentiation calculation $A^h$ mod n is then performed (block 16) based on these variables. This calculation amounts to calculating quantity $r^{-d}$ mod n. The result is contained in variable T.

A product (block 18, $C=C'.T.r^{-d}$) of the previously-calculated value $(M.r)^d$ mod n by the quantity just calculated, mod n, is finally performed. The result provides modular exponentiation $M^d$ mod n, which is returned (block 19, RETURN C) as the result of the calculation.

The calculation of FIG. 1 actually requires two modular exponentiations. A first exponentiation is used to calculate result $(M.r)^d$ mod n, masked by random quantity r, which amounts to 2m multiplications (block 51, and blocks 54 or 54', for each bit of exponent d). A second modular exponentiation is required to eliminate the contribution of random quantity r (block 16). This calculation here again requires 2m multiplications. Further, quantity d is exposed for each calculation. At the end of the calculation, it is possible either to perform a modular inversion $(r^d)^{-1}$ mod n, which is multiplied by $(M.r)^d$, or to use −d to perform operation $M^{rd}.r^{-d}$, and provide the result.

Figure 2:
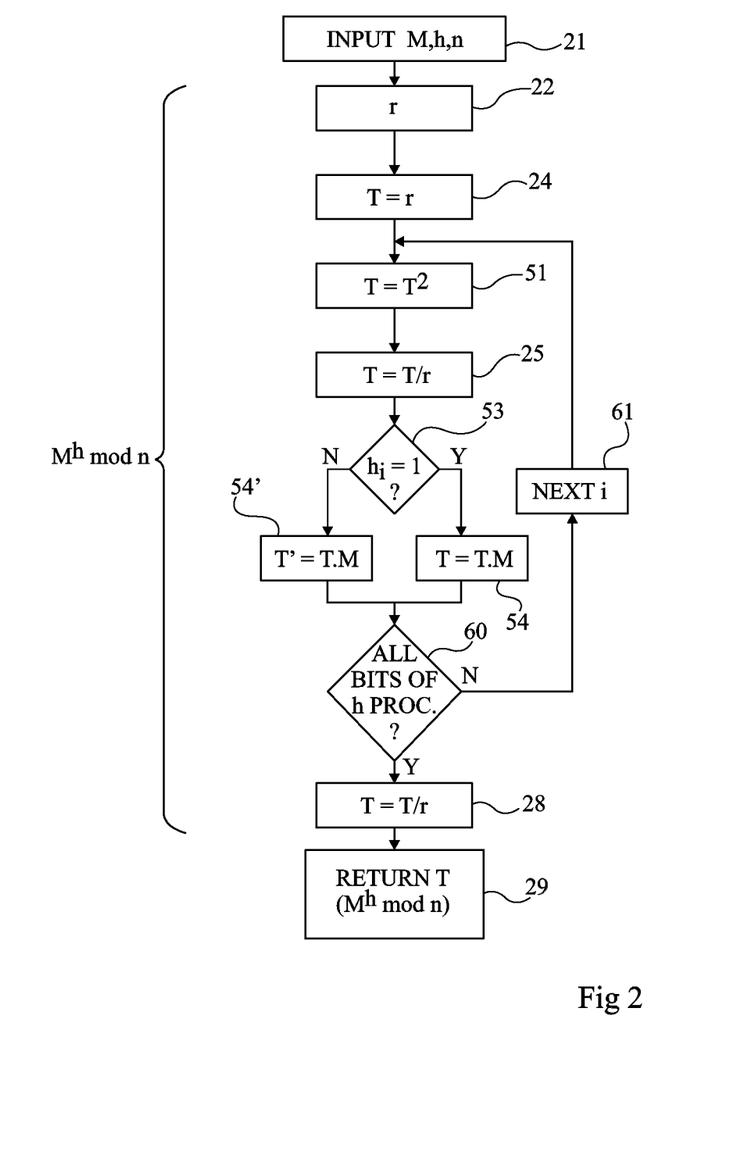
FIG. 2 is a flowchart of an embodiment of a modular exponentiation calculation.

FIG. 2 is a simplified flowchart of an embodiment according to the first aspect of a modular exponentiation calculation. FIG. 2 illustrates a modular exponentiation calculation in which the exponent bits are processed from left to right (from the most significant bit to the least significant bit).

According to this embodiment, the data input into the calculation cell (block 21, INPUT M, h, n) are message or data M to be submitted to the modular exponentiation, exponent h of this exponentiation, and its modulo n. As compared with the example of FIG. 1, a difference can already be noted, which is that the data input into the calculation cell are not masked with a random number.

At a first step 22, a random value r is selected. This selection for example directly is a general random selection, or a random selection from a table of numbers, etc. Number r is different from zero and is prime with modulo n.

Then (block 24, T=r), a variable T (arbitrarily called the first one) is initialized with quantity r.

An iterative calculation loop on bits i of exponent h is then started. A first step 51 ($T=T^2$) of this loop comprises squaring the content of variable T. Then (block 25, T=T/r), the content of variable T is divided by random quantity r, the inverse (1/r) of quantity r being the inverse modulo n, preferably pre-calculated. A test 53 ($h_i=1$?) is then performed on the value of current bit $h_i$ of the exponent and, according to this value, a multiplication (block 54, T=T.M) of variable T by data M (arbitrarily called the second variable) is performed, or a dummy variable T' (arbitrarily called the third variable), which is not taken into account in the result and which is updated by the same calculation (block 54', T'=T.M), is used. The use of dummy variable T', although it is optional, is preferred. As long as all the bits of exponent h have not been processed yet (output N of block 60, ALL BITS OF h PROC. ?), it is proceeded to the next bit (block 61, NEXT i) and it is returned to the input of step 51. Once all the exponent bits have been processed, a last division of variable T by random quantity r is performed (bloc 28, T=T/r). Variable T then contains result $M^h$ mod n and this result is returned as the value of the modular exponentiation (block 29, RETURN T).

Involving the random quantity in the modular exponentiation loop enables to limit the drift due to the intervention of the random quantity in each round. In the example of FIG. 1, for each round, the drift introduced by the random number increases, to reach a power h of this drift, which requires the second unmasking modular exponentiation. Now, for the protection to be efficient, there should be a random element in the calculation but the drift introduced by this random element does not have to increase along iterations.

As compared with the example of FIG. 1, a single exponentiation calculation is thus now sufficient. Since this calculation involves, for each round, a division by the random number (block 25), and thus a multiplication, the total number of multiplications is 3m to reach the result. This saves 25% of resources with respect to the solution of FIG. 1.

According to a specific embodiment, random quantity r is selected to correspond to a power of 2 ($r=2^k$). This enables to carry out steps 25 and 53 in parallel if steps 25 and 53 are executed by two different processors. Indeed, step 25 amounts to shifting the bits and takes some time. This can be compensated by performing test 53 at the same time.

Figure 2A:
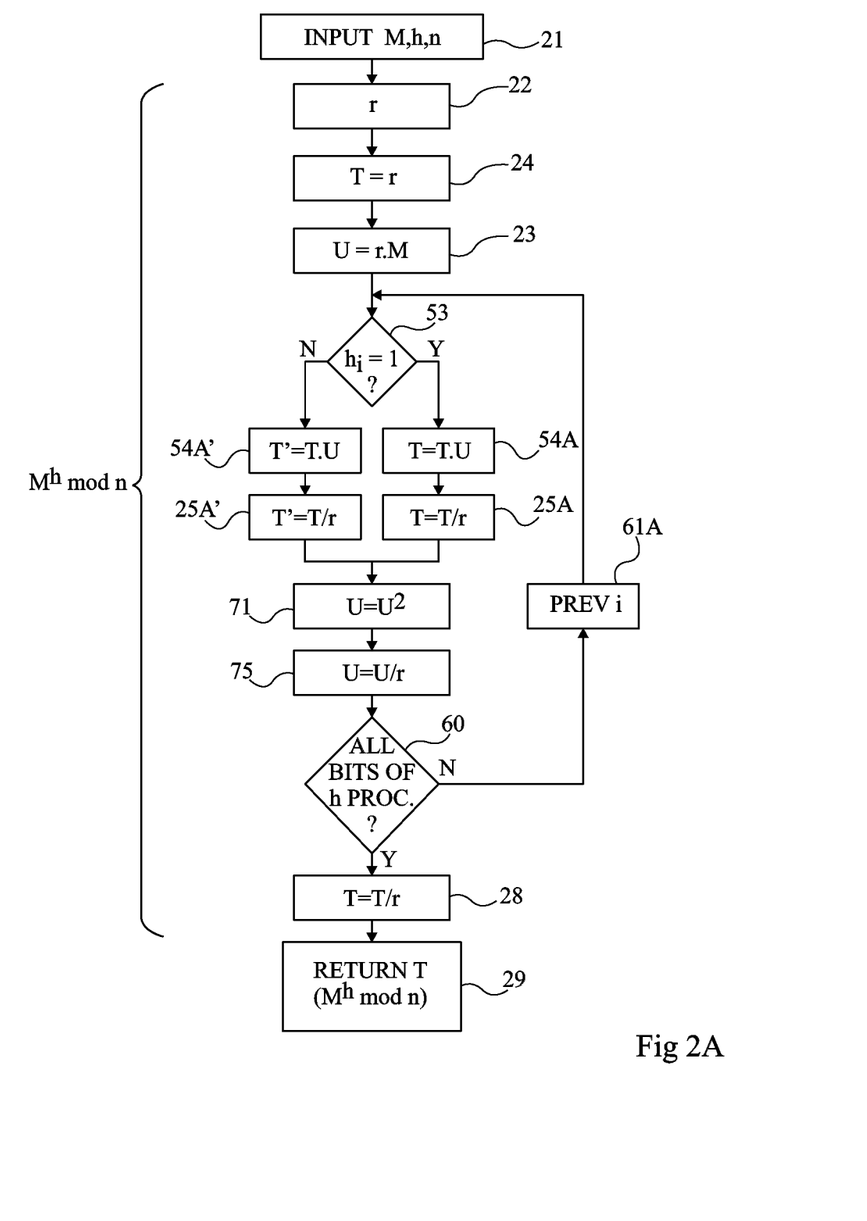
FIG. 2A is a flowchart of a variation of the embodiment of FIG. 2.

FIG. 2A illustrates a calculation similar to that in FIG. 2, but performed from right to left, that is, from the least significant bit to the most significant bit (by decrementing rank i of the exponent instead of incrementing it—block 61A, PREV i). As compared with the discussion of FIG. 2:

- a variable U (arbitrarily called the second one) is initialized (block 23, U=M.r) with the product of quantity r by message M—as a variation, the calculations on variable U are directly performed in the variable containing message M;
- steps 51 and 25 are replaced with similar steps (block 71, $U=U^2$ and 75, U=U/r) of update of variable U, transferred before step 60, after the operations conditioned by test 53;
- step 54 is replaced with a step 54A (T=T.U) taking into account variable U instead of data M and, in the case where variable T' (arbitrarily called the third variable) is used, a similar dummy update (block 54A', T'=T.U) is performed; and step 54A is followed by a step identical to step 25 (block 25A, T=T/r) and, in the case where variable T' is used, a similar update (bloc 25A', T'=T/r) is performed after step 54A'.

Figure 2B:
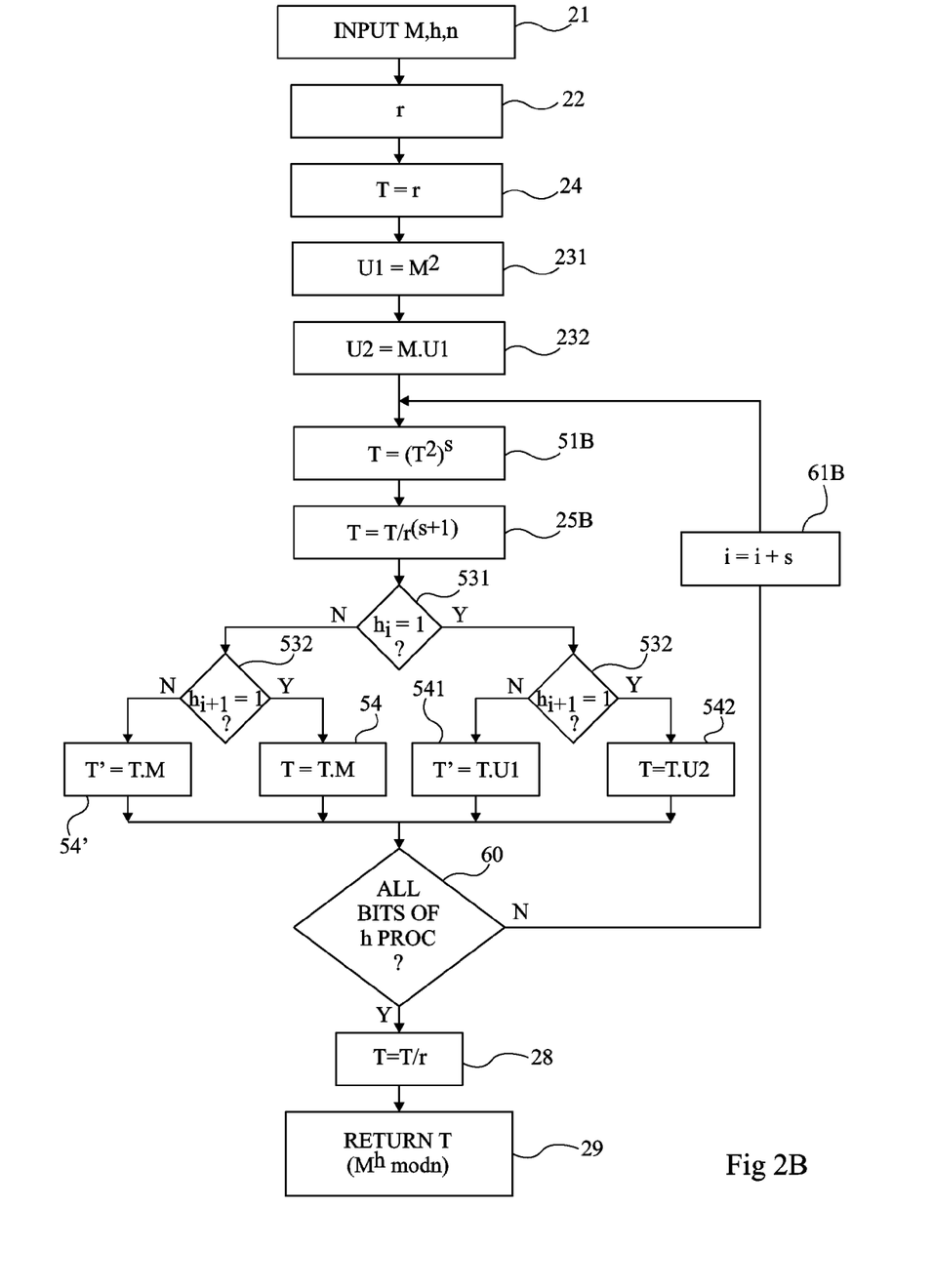
FIG. 2B is a flowchart of another variation of the embodiment of FIG. 2.

FIG. 2B illustrates another variation of the embodiment of FIG. 2, in which the exponent bits are not processed one by one, but in groups (slots) of a number s of bits. FIG. 2B illustrates an example of a 2-bit slot (s=2).

As compared with FIG. 2:
- two variables U1 and U2 are pre-calculated (block 231, $U1=M^2$ and block 232, U2=M.U1) and respectively contain square $M^2$ and cube $M^3$ of data M—more generally, s variables Uj (with j ranging between 1 and s) respectively containing value Mi are pre-calculated;
- step 51 is replaced with a step (block 51B, $T=T^{2s}$) of raising to the 2.s-th power, that is, $T^4$ in the present example;
- step 25 is replaced with a step (block 25B, $T=T/r^{(s+1)}$) of division of variable T by a power s+1, that is, 3 in the present example, of random quantity r;
- test 53 is replaced with a test 531 ($h_i=1$?) of the value of the first (least significant) bit of the group of bits and tests 532 ($h_{i+1}=1$?) of the value of the second bit of the group of bits—more generally, a selection of the following step of update of variable T is performed according to the value of the considered bit slot (for a two-bit slot, one test 531 and two tests 532 will be necessary, a three bit slot will need one test 531, two test 532, and four tests of the state of bit $h_{i+2}$, etc.);
- according to the result of tests 531 and 532, variable T is updated with: for a pair of bits $h_i h_{i+1}$ corresponding to 11, the product (block 542, T=T.U2) of the content of variable T by variable U2, for a pair corresponding to 10, its product (block 541, T=T.U1) by variable U1, for a pair corresponding to 01, its product (block 54, T=T.M) by data M, and for a pair corresponding to 00, variable T' is updated (step 54')—more generally, variable T is updated with its product by a power of data M, which is a function of the decimal value corresponding to the values of the considered bit slot; and
- step 61 is replaced by a step 61B (i=i+s) incrementing the rank of the exponent by size s of the processed bit slot for each iteration.

Figure 3:
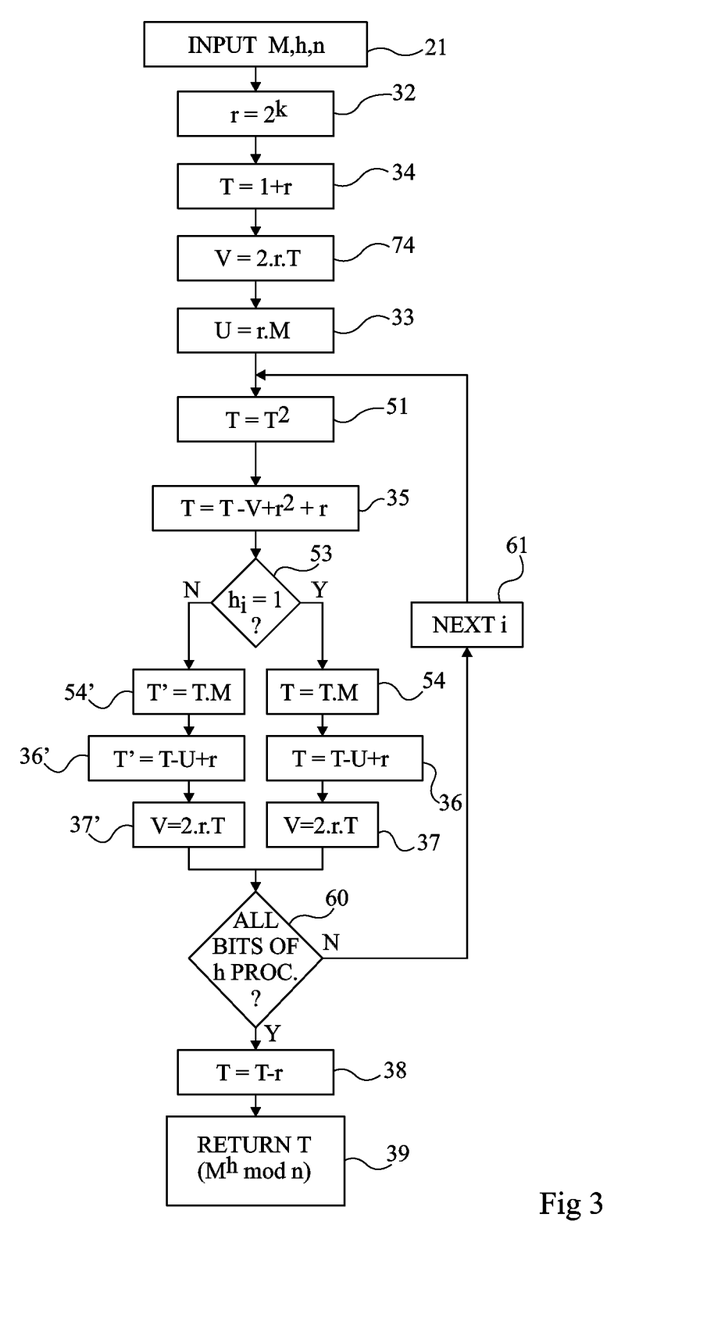
FIG. 3 illustrates another embodiment of a modular exponentiation calculation.

FIG. 3 is a flowchart illustrating another embodiment according to the first aspect.

As in the embodiment of FIG. 2, the modular exponentiation calculation cell receives (block 21) data M to be submitted to the modular exponentiation, exponent h, and modulo n. FIG. 3 depicts a calculation performed from left to right (by incrementing rank i of the exponent bit).

It is started (block 32, $r=2^k$) by selecting a random number, preferably, but not necessarily, so that it corresponds to a power of 2.

Three variables T (arbitrarily called the first variable), V, and U (arbitrarily called the second variable), are respectively initialized with the adding of one (1) to quantity r, the product of this value of variable T by twice quantity r, and the product of quantities r and M (block 34, T=1+r; block 74, V=2.T.r, and block 33, U=r.M).

Then, iterations are performed in a loop on the different bits $h_i$ of the exponent. For each bit, it is started by squaring (bloc 51, $T=T^2$) variable T. Then, an operation (block 35, $T=T-V+r^2+r$) comprising subtracting, from variable T provided by the previous step, the value of variable V, and adding thereto the square (pre-calculated) of value r, and value r, is performed.

Test 53 ($h_i=1$?) of the state of the exponent bit is then performed. If the state is 1 (output Y of block 53), variable T is updated (block 54, T=T.M) with the product by data M (arbitrarily called the third variable), updated (block 36, T=T−U+r) by being subtracted the product of data M by random quantity r (pre-calculated) and by being added quantity r, and the result is multiplied (block 37, V=2.r.T) by twice quantity r (pre-calculated) and copied in variable V (arbitrarily called the fourth variable). In the case where the exponent bit is at 0 (output N of block 53), the same operations are performed (blocks 54', T'=T.M, 36', T'=T−U+r, and 37, V=2.r.T) by updating, for steps 54' and 36', a variable T' (arbitrarily, the fifth variable) which is not taken into account in the result, and then variable V as at step 37 of the other branch. The use of dummy variable T (steps 54' and 36'), although it is optional, is preferred.

At step 35, the performed operation comprises eliminating the drift introduced by the previous round while this drift is reintroduced at steps 36 and 37 to maintain the protection.

As long as all bits i of exponent h have not been processed yet (output N of block 60, ALL BITS OF h PROC. ?), it is proceeded to the next bit (block 61, NEXT i) and it is returned to the input of step 51.

Once all bits have been processed (output Y of block 60), random quantity r is subtracted to result T (block 38, T=T−r). The obtained result (block 39, RETURN T) contains value $M^h$ mod n.

An embodiment comprising adding the random quantity as described in relation with FIG. 3 only requires one modular exponentiation calculation and minimizes the number of multiplications on "large" numbers (typically, the message comprises at least 2,048 bits), which is resource-consuming, by limiting it to m (number of bits of exponent h) multiplications (blocks 54, 54'). The multiplications by 2. r at blocks 37 and 37' are less disturbing since they are multiplications by a "small" number (for example, 128 bits) as compared with the size of the message. Performing additions is indeed much simpler than performing multiplications. For an addition, it is sufficient to use, for example, XOR gates.

Further, the embodiment of FIG. 3 enables to perform in parallel the multiplication of block 51 with the variable terms of block 36, that is, multiplication V. r. Time is thus saved.

Taking into account the random quantity in the iterations (canceling the drift linked to the previous round) enables to use an addition rather than a multiplication.

Figure 3A:
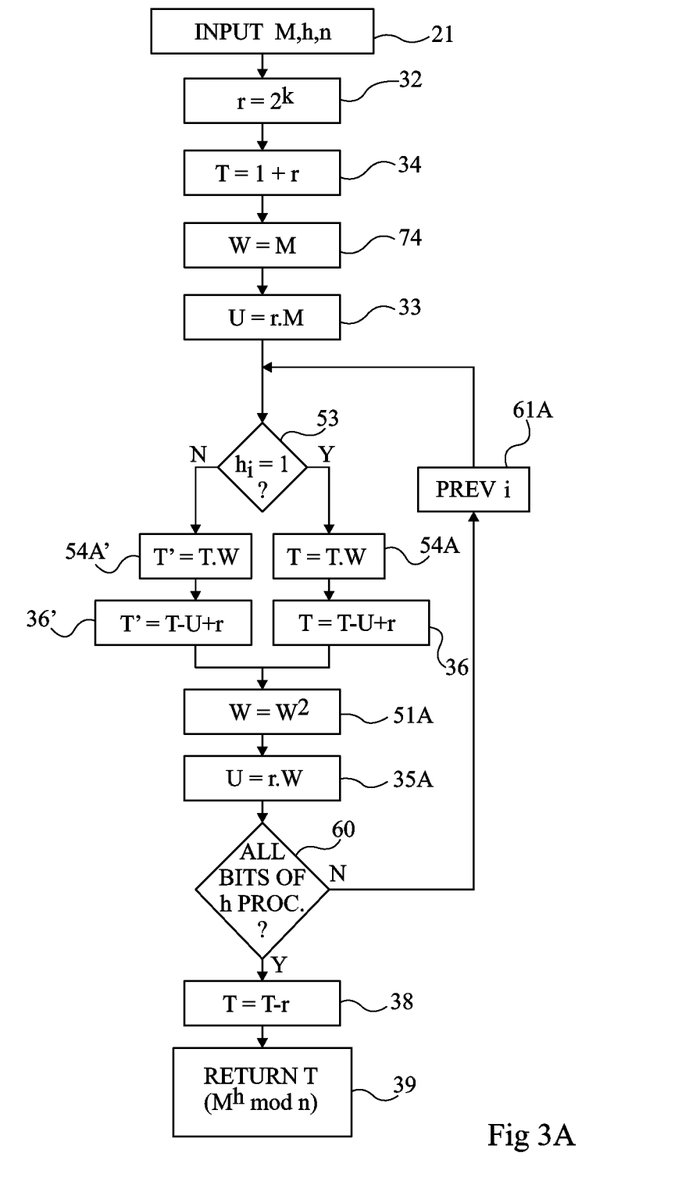
FIG. 3A illustrates a variation of the embodiment of FIG. 3.

FIG. 3A illustrates a variation in which the calculation is performed from left to right (by decrementing rank i of the exponent bit towards the least significant bit—block 61A, PREY i). As compared with the discussion of FIG. 3:
- a variable W (arbitrarily called the third variable) is initialized (block 74, W=M) with the value of data M—as a variation, the calculations on variable W are directly performed in the variable containing message M;
- step 51 is replaced with a similar step 51A of update (W=W²) by squaring of the value of variable W, transferred before step 60, after the operations conditioned by test 53;
- step 54 is replaced with a step 54A (T=T.W) taking into account variable W instead of data M and, in the case of a use of variable T', a similar dummy update (block 54A', T'=T.W) is performed; and
- step 35 is replaced with a step 35A (U=r.W), transferred between steps 51A and 60, and wherein variable U is updated by the product of the content of variable W by random quantity r.

According to a second aspect, it is provided to apply a principle similar to that of FIG. 2 to a calculation on elliptic curves.

Figure 4:
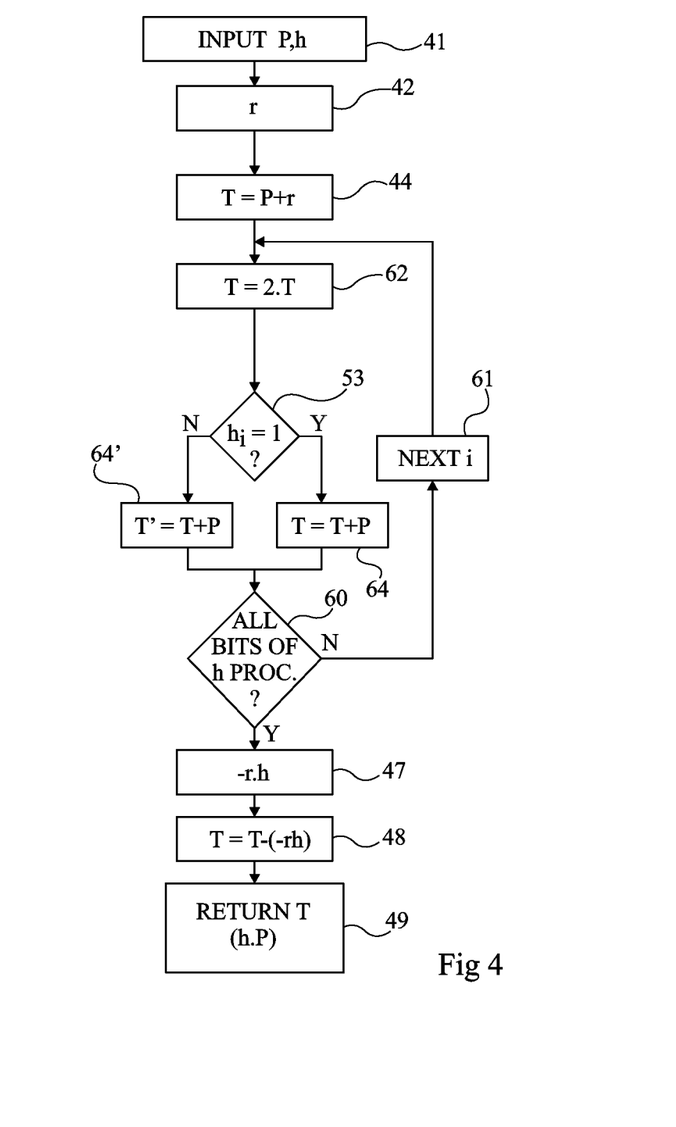
FIG. 4 is a simplified flowchart of a usual example of calculation on elliptic curves.

FIG. 4 is a simplified flowchart illustrating a usual example of calculation on an elliptic curve.

The aim is to calculate a product h.P where P stands for the equivalent of the message to be encrypted and h stands for a secret quantity. In an application to cryptography on elliptic curves, the message corresponds to a point P of the curve and quantity h corresponds to an integer by which this point is multiplied. In an asymmetrical cryptography, quantity h is only known by one of the two parties. Product P.h is attempted to be calculated while protecting quantity h.

For this purpose, as illustrated in FIG. 4, the calculation cell receives (block 41, INPUT P, h) quantities P and h to be submitted to the algorithm.

Then (block 42), a random quantity r is selected and a variable T is initialized (block 44, T=P+r) by the addition of quantity r to point P of the elliptic curve.

An iterative loop is then started in which, for each bit $h_i$ of secret quantity h, quantity T is first multiplied by two (block 62, T=2.T). Then, according to the state of the bit of the secret quantity (block 53, $h_i$=1?), a useful calculation or a dummy calculation is performed in the same way as in the embodiments of the first aspect. If bit $h_i$ of quantity h is at 1 (output Y of block 53), variable T is updated by being added point P (block 64, T=T+P). If it is not (output N of block 53), a variable T', useless for the result, is updated by the same operation (block 64', T'=T+P). Here again, this dummy calculation, although it is optional, is preferable and improves the protection.

As long as all the bits of quantity h have not been processed (output N of block 60, ALL BITS OF h PROC. ?), it is proceeded to the next bit (block 61, NEXT i) and it is returned to the input of block 62. Once all bits have been processed (output Y of block 60), two operations should be performed, that is, a multiplication (block 47, −r.h) of the random quantity by key h, followed by a subtraction (block 48, T=T−(−r.h)) of the result of this multiplication from the content of variable T, to eliminate the contribution of random quantity r. The result contained in variable T (block 49, RETURN T) is finally returned. This result corresponds to the operation on the elliptic curves, noted h.P.

Figure 5:
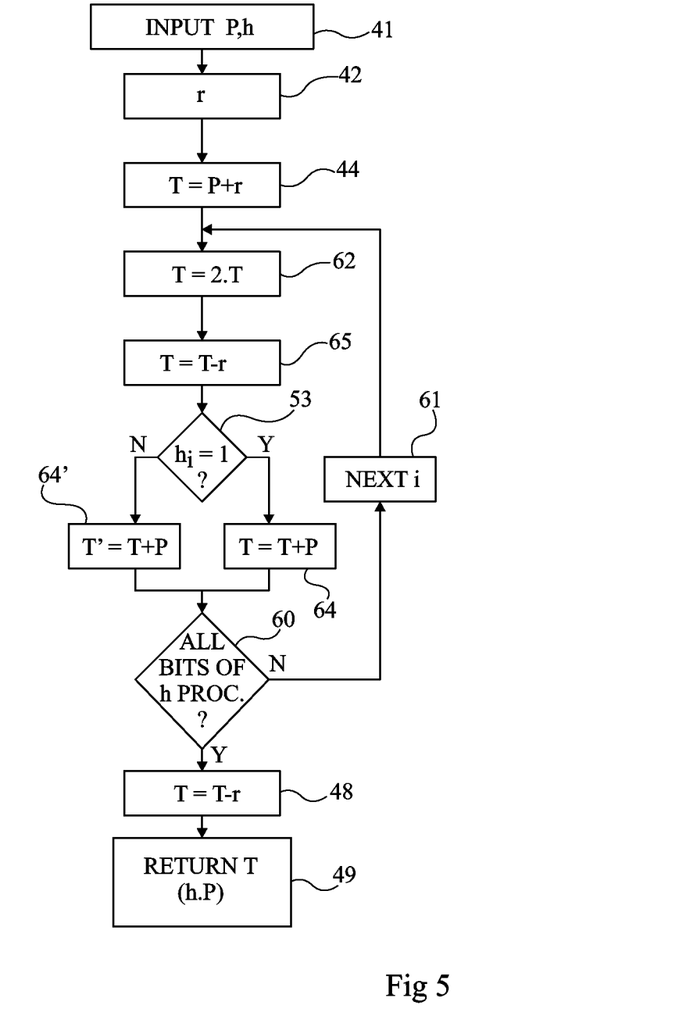
FIG. 5 illustrates an embodiment applied to a calculation on elliptic curves.

FIG. 5 is a flowchart illustrating an embodiment of a calculation on elliptic curves. FIG. 5 illustrates a calculation performed from left to right (step 61 corresponds to incrementing rank i of the exponent bit towards the most significant bit).

Here again, the aim is to calculate a product h. P, where P stands for the equivalent of the message to be encrypted and h stands for a secret quantity.

As previously, the calculation cell receives (block 41, INPUT P, h) quantities P and h to be submitted to the algorithm.

Then (block 42), a random quantity r is selected and a variable T (arbitrarily, the first one) is initialized (block 44, T=P+r) by the addition of quantity r to point P of the elliptic curve.

An iterative loop is then started in which, for each bit $h_i$ of secret quantity h, quantity T is first multiplied by two (block 62, T=2.T), after which variable T is updated by being subtracted random quantity r (bloc 65, T=T−r). Finally, according to the state of the bit of the secret quantity (block 53, $h_i$=1?), a useful calculation or a dummy calculation is performed in the same way as in the embodiments of the first aspect. If bit $h_i$ of quantity h is at 1 (output Y of block 53), variable T is updated by being added point P (block 64, T=T+P). If it is not (output N of block 53), a variable T', useless for the result, is updated by the same operation (block 64', T'=T+P). Here again, this dummy calculation, although it is optional, is preferable and improves the protection.

As long as all the bits of quantity h have not been processed (output N of block 60, ALL BITS OF h PROC. ?), it is proceeded to the next bit (block 61, NEXT i) and it is returned to the input of block 62. Once all bits have been processed (output Y of block 60), a last operation (bloc 48, T=T−r) is performed to eliminate the last contribution of random quantity r and the result contained in variable T (block 49, RETURN T) is returned. This result corresponds to the operation on the elliptic curves, noted h. P.

Like for the other aspects, involving the random quantity in the iterative calculation and progressively eliminating the drift simplifies calculations and is less power and time resource consuming.

Figure 5A:
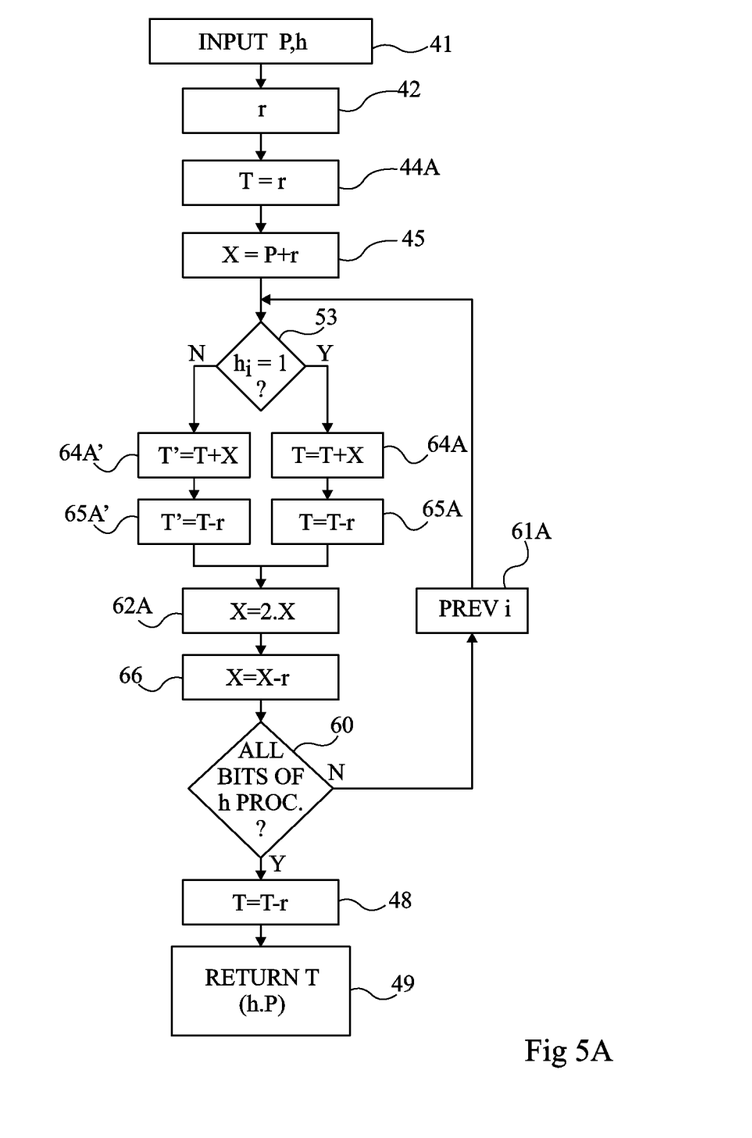
FIG. 5A is a flowchart of a variation of the embodiment of FIG. 5.

FIG. 5A illustrates a variation in which the calculation is performed from left to right (by decrementing rank i of the exponent bit towards the least significant bit—block 61A, PREV i). As compared with the discussion of FIG. 5:
- variable T is initialized (block 44A) with random quantity r;
- a variable X (arbitrarily called the second variable) is initialized (block 45, X=P+r) by the sum of point P and of random quantity r—as a variation, variable P itself is used (P=P+r);
- steps 62 and 65 are replaced with similar steps (X=2.X et X=X−r) of update of variable X, transferred before step 60, after the operations conditioned by test 53;
- step 64 is modified at step 64A (T=T+X) where variable P is replaced with variable X and is followed by a step 65A identical to step 65 (T=T−r), and in the case variable T' is used, similar operations (blocks 64A', T'=T+X and 65A', T'=T−r) are performed thereon.

Figure 5B:
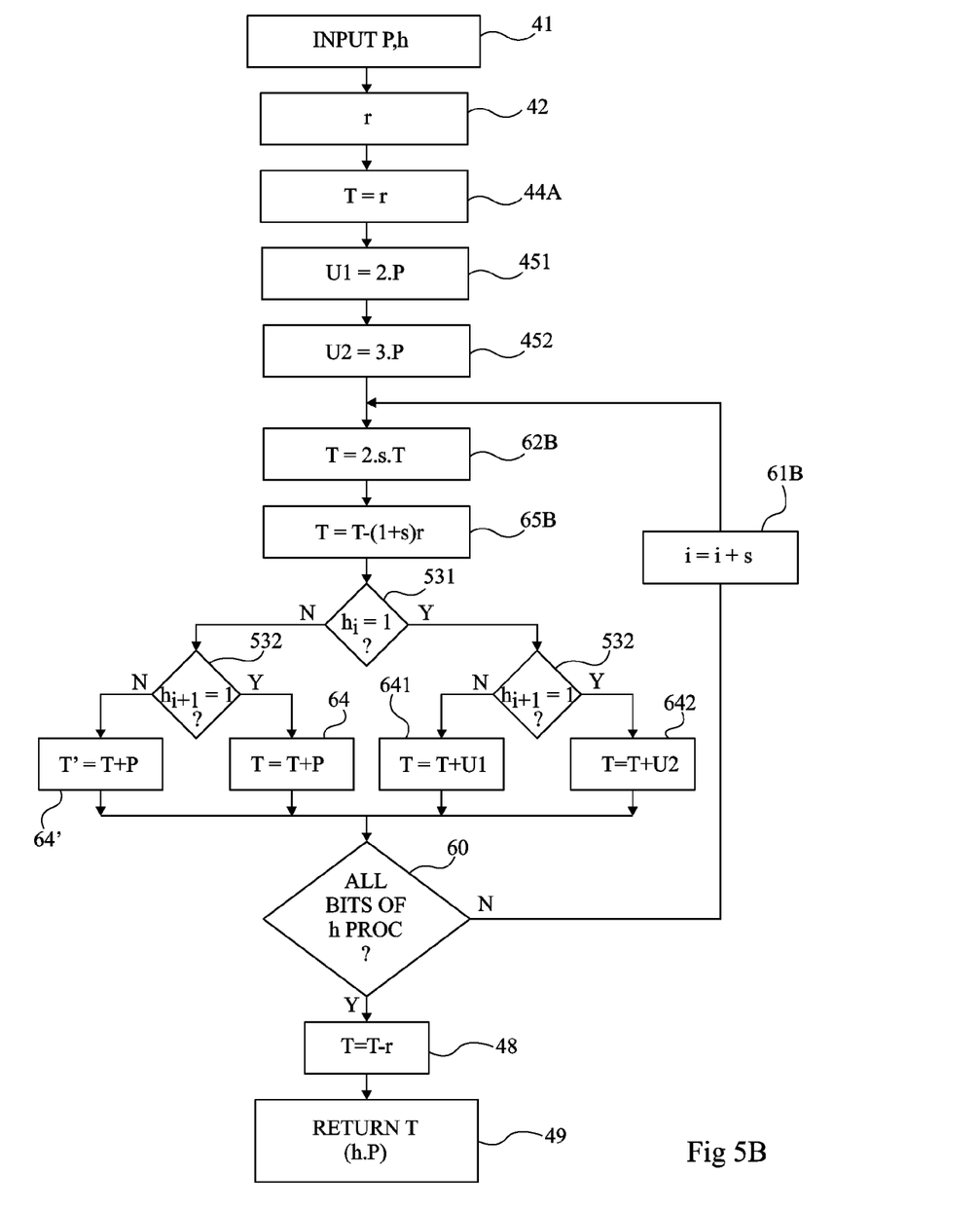
FIG. 5B is a flowchart of another variation of the embodiment of FIG. 5.

FIG. 5B illustrates another variation of the embodiment of FIG. 5, in which the exponent bits are not processed one by one, but in groups (slots) of a number s of bits. FIG. 5B illustrates an example of a 2-bit slot (s=2).

As compared with FIG. 5:
- step 44 is replaced by step 44A (FIG. 5A);
- two variables U1 and U2 are pre-calculated (block 451, U1=2.P and block 452, U2=3.P) and respectively contain double 2.P and triple 3.P the value of point P—more generally, s variables Uj (with j ranging between 1 and s) respectively containing value (j+1). P are pre-calculated;
- step 62 is replaced with a step (block 62B, T=2.s.T) of multiplication by 2.s, that is, 4 in the present example;
- step 65 is replaced with a step (block 65B, T=T−(1+s).r) of subtraction of the product by 1+s, that is, 3 in the present example, of random quantity r;
- test 53 is replaced with a test 531 ($h_i$=1?) of the value of the first (least significant) bit of the group of bits and tests 532 ($h_{i+1}$=1?) of the value of the second bit of the group of bits—more generally, a selection of the following step of update of variable T is performed according to the value of the considered bit slot in the same way as in the embodiment of FIG. 2B;
- according to the result of tests 531 and 532, variable T is updated with: for a pair of bits $h_i$; $h_{i+1}$ corresponding to 11, the sum (block 642, T=T+U2) of the content of variable T and of that of variable U2, for a pair corresponding to 10, its sum (block 641, T=T+U1) by the content of variable U1, for a pair corresponding to 01, its addition (block 64, T=T+P) to point P, and for a pair corresponding to 00, variable T' is updated (step 64')—more generally, variable T is updated by being added point P a number of times which is a function of the decimal value corresponding to the values of the considered bit slot; and
- step 61 is replaced with a step 61B (i=i+s) incrementing the rank of the exponent by size s of the processed bit slot for each iteration.

An advantage of the described embodiments, in the first aspect as well as in the second one, is that secret quantity h is no longer directly exposed to a possibly attack.

Various embodiments have been described. Various alterations, modifications, and improvements will occur to those skilled in the art. Further, the implementation of the described embodiments is within the abilities of those skilled in the art based on the functional indications given hereabove and by means of usual tools. The number of temporary storage elements (registers and the like) to be used depends on the circuit possibilities as well as the execution of certain operations in parallel. The size of the variables and of the data depends on the implemented algorithms. Further, although the embodiments have been described by more specifically referring to software, these embodiments are preferably implemented, at least at the level of the calculation cell of the modular exponentiation operation, preferably in hardware form by using a same calculation cell. The multiplication and modular squaring operations are wired and their use is controlled by a program.

Such alterations, modifications, and improvements are intended to be part of this disclosure, and are intended to be within the spirit and the scope of the present invention. Accordingly, the foregoing description is by way of example only and is not intended to be limiting. The present invention is limited only as defined in the following claims and the equivalents thereto.

What is claimed is:

1. A method comprising:
    protecting a calculation of a modular exponentiation of a digital value in a cryptographic process using an electronic circuit, comprising:
    initializing a first variable with a random value;
    initializing at least a second variable with a function of said digital value;
    at least for a bit equal to 1 of a binary representation of an exponent of the modular exponentiation, updating the first variable, wherein the updating comprises:
    a) determining a quotient of a first value of the first variable and an exponentiation of said random value raised to a first power; and
    b) determining a product of a second value of the first variable and a value of the second variable,
    after all bits of the binary representation of the exponent have been processed, dividing a third value of said first variable by said random value to provide a result of the modular exponentiation.

2. The method of claim 1, wherein step a) is performed for all the bits of the binary representation of the exponent and is performed before step b), the bits of the binary representation of the exponent being processed successively starting from a least significant bit to a most significant bit and the second variable is initialized with said digital value.

3. The method of claim 2, wherein the first value of said first variable is equal to a square of a fourth value of the first variable, and the first power is equal to 1.

4. The method of claim 1, wherein step a) is performed after step b), the first variable being updated only for bits of binary representation of the exponent that are equal to 1, the bits of the binary representation of the exponent that are equal to 1 being successively processed starting from a most significant bit to a least significant bit, and the value of the second variable being initialized with said digital value multiplied by the random value.

5. The method of claim 4, wherein, for each bit of the binary representation of the exponent:
the second variable is updated by squaring the value of the second variable; and
a result of updating the second variable is divided by the random value.

6. The method of claim 2, wherein, for a bit equal to 0 of binary representation of the exponent, a third variable is updated at least with the second value of the first variable multiplied by the value of the second variable.

7. The method of claim 1, wherein:
the bits of the binary representation of the exponent are successively processed by groups of bits;
step a) is performed for each group of bits and corresponds to dividing the first value of the first variable by an exponentiation of the random value raised to the first power, the first power equal to the number of bits in the group of bits;
step a) is performed before step b); and
step b) is performed for all groups of bits comprising at least one bit equal to 1.

8. The method of claim 7, wherein step b) comprises updating the first variable with an exponentiation of said digital value raised to a second power, the second power corresponding to a decimal value represented by the bits in the group of bits.

9. The method of claim 7, wherein, if all bits in the group of bits are equal to 0, a third variable is updated at least with the second value of the first variable multiplied by the value of the second variable.

10. The method of claim 1, wherein said random value is a power of two.

11. The method of claim 1, wherein said exponent corresponds to a secret value.

12. The method of claim 1, wherein the cryptographic process includes an RSA algorithm.

13. A method comprising:
protecting cryptographic operations comprising a modular exponentiation of a digital value, using an electronic circuit, comprising:
initializing a first variable with a random value;
initializing a second variable with a function of the digital value; and
performing a plurality of iterations, wherein each of the plurality of iterations comprises updating the first variable, the updating comprising:
(a) dividing a first value of the first variable by an exponentiation of the random value, and
(b) multiplying a second value of the first variable by a value of the second variable.

14. The method of claim 13, wherein:
each of the plurality of iterations corresponds to a bit in a binary representation of an exponent of the modular exponentiation, each of the plurality of iterations being performed successively from a least significant bit to a most significant bit of the binary representation of the exponent; and
step (a) is performed, for each bit of the binary representation of the exponent, before step (b).

15. The method of claim 14, wherein a third value of the first variable is squared before step (a), and wherein the exponentiation in step (a) is to a power of 1.

16. The method of claim 13, wherein:
each of the plurality of iterations corresponds to a bit in a binary representation of an exponent of the modular exponentiation, each of the plurality of iterations being performed successively from a most significant bit to a least significant bit of the binary representation of the exponent; and
step (a) is only performed for bits of the binary representation of the exponent that are equal to 1, and is performed after step (b).

17. The method of claim 16, wherein each of the plurality of iterations comprises squaring the value of the second variable and dividing a result of the squaring by the random value.

18. A device comprising: electronic circuitry configured to protect cryptographic operations comprising a modular exponentiation of a digit value, the protection comprising:
initialize a first variable with a random value;
initialize a second variable with a function of the digital value; and
perform a plurality of iterations, wherein each of the plurality of iterations comprises updating the first variable, the updating comprising:
(a) dividing a first value of the first variable by an exponentiation of the random value, and
(b) multiplying a second value of the first variable by a value of the second variable.

19. The electronic circuit of claim 18, wherein:
each of the plurality of iterations corresponds to a bit in a binary representation of an exponent of the modular exponentiation, each of the plurality of iterations being performed successively from a least significant bit to a most significant bit of the binary representation of the exponent; and
step (a) is performed, for each bit of the binary representation of the exponent, before step (b).

20. The electronic circuit of claim 19, wherein a third value of the first variable is squared before step (a), and wherein the exponentiation in step (a) is to a power of 1.

21. The electronic circuit of claim 18, wherein:
each of the plurality of iterations corresponds to a bit in a binary representation of an exponent of the modular exponentiation, each of the plurality of iterations being performed successively from a most significant bit to a least significant bit of the binary representation of the exponent; and
step (a) is only performed for bits of the binary representation the exponent that are equal to 1, and is performed after step (b).

22. The electronic circuit of claim 21, wherein each of the plurality of iterations comprises squaring the value of the second variable and dividing a result of the squaring by the random value.

* * * * *

UNITED STATES PATENT AND TRADEMARK OFFICE
CERTIFICATE OF CORRECTION

| | |
|---|---|
| PATENT NO. | : 8,767,955 B2 |
| APPLICATION NO. | : 13/543106 |
| DATED | : July 1, 2014 |
| INVENTOR(S) | : Yannick Teglia |

Page 1 of 1

It is certified that error appears in the above-identified patent and that said Letters Patent is hereby corrected as shown below:

In the Specification:

Column 4, line 29, "Md.M d=M0=1" should read --$M^d.M^{-d} = M^0 = 1$--;

Column 6, line 58, "block" should read --bloc--;

Column 7, line 46, "PREY" should read --PREV--; and

Column 9, line 17, "PREY" should read --PREV--.

In the Claims:

Claim 18, Column 12, line 21, "digit" should read --digital--.

Signed and Sealed this
Seventh Day of October, 2014

Michelle K. Lee
*Deputy Director of the United States Patent and Trademark Office*